(No Model.)

J. DOWLING.
Coffee Pot.

No. 240,976. Patented May 3, 1881.

Attest:
Herm Lauten
Jno. C. Henderson

Inventor:
John Dowling
By H. S. Abbot.
Attorney.

UNITED STATES PATENT OFFICE.

JOHN DOWLING, OF WILKESBARRE, PENNSYLVANIA.

COFFEE-POT.

SPECIFICATION forming part of Letters Patent No. 240,976, dated May 3, 1881.

Application filed March 10, 1881. (No model.)

*To all whom it may concern:*

Be it known that I, JOHN DOWLING, a citizen of the United States, residing at Wilkesbarre, in the county of Luzerne and State of Pennsylvania, have invented certain new and useful Improvements in Coffee-Pots; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
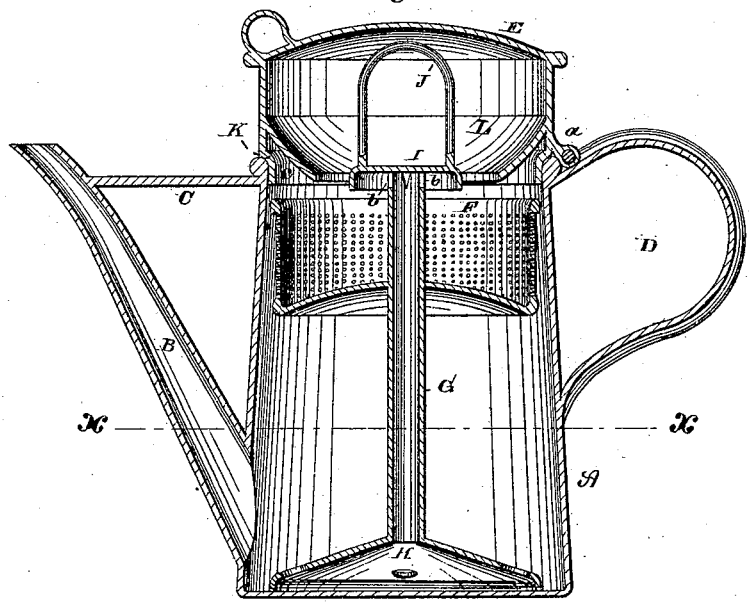
Figure 2:
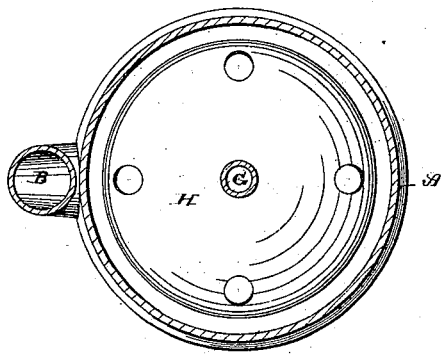

Figure 1 is a vertical section through the pot and its component parts, and Fig. 2 a cross-section on the line $x\ x$ of Fig. 1.

My invention relates to coffee-pots; and it consists in the construction and the combination of parts hereinafter particularly described, and then sought to be specifically defined by the claims.

In the accompanying drawings, the letter A indicates the cylinder of the pot; B, the spout braced by the rod C; D, the handle, and E the cover, hinged to the handle or cylinder at $a$, where the handle and cylinder join each other. Within the cylinder there is placed a filter consisting of a cup, F, having perforated sides and a convexo-concave bottom, the convex portion being inside the filter, so that the coffee extract will be directed to the sides of the cup, through which it passes into the cylinder $a$. This cup is supported on a vertical tube, G, having a conical or other shaped base, H, which is perforated through its top or sides and rests upon the bottom of cylinder A. At the top this tube has a cap, I, which serves to direct the steam or water which passes up the tube and through openings $b$ onto the coffee held in cup F. The cap I is provided with a handle, J, and the cup, tube, its base, and cap, being all connected together, can be lifted from the cylinder by grasping the handle J, by which they may be suspended from any hook when not within the cylinder.

The cover E has a flange, K, which fits within the cylinder against its top edge, so as to make quite a close joint and prevent the aroma of the coffee from escaping. It is also provided with a deflecting or condensing plate, L, which inclines inwardly from the sides of the cup, leaving a space, $c$, between the flange K and the plate, so that the plate is protected by the flange from injury from blows or knocks that it might otherwise receive. The top surface of the plate L is preferably made concave, and the function of it is to condense the vapor rising within the cylinder and direct it back onto the coffee contained in the cup F.

In operation ground coffee is placed in the perforated cup F, and is slightly dampened, to prevent the aroma from passing off before steam or water sufficient for that purpose rises through tube G. Water, boiling or cold, is then put into cylinder A, it not being allowed, however, to rise as far as the perforated sides of the cup. The cover is then shut down and the pot put over the fire for the water to boil. When the water boils the steam or water rises in tube G and passes out of the top, and is directed by cap I onto the coffee in cup F. It then draws the extract from the coffee, and the extract passes through the perforated sides of the cup and drops into the water below, thereby producing filtered coffee, leaving the grounds in the cup.

The device is cheap of manufacture, and its parts can be readily removed for the purpose of being cleansed.

Having described my invention, what I claim is—

1. The combination of cylinder A, tube G, raised perforated base H, cap I, and cup F, having perforated sides and convex bottom, substantially as and for the purpose set forth.

2. The combination of cylinder A, cup F, having perforated sides and convex bottom, and supported by tube G, raised perforated base H at the lower end of the tube, cap I at the upper end of the tube, and handle J connected to said cap, substantially as and for the purposes specified.

In testimony whereof I affix my signature in the presence of two witnesses.

JOHN DOWLING.

Witnesses:
 E. R. BARRETT,
 B. P. BOYLE.